United States Patent Office 2,868,641
Patented Jan. 13, 1959

2,868,641

BEATER SATURATED SHEETS HAVING INCREASED STRENGTH

David A. Feigley, Jr., Lancaster Township, Lancaster County, Pa., assignor to Armstrong Cork Company, Lancaster, Pa., a corporation of Pennsylvania No Drawing. Application July 20, 1956
Serial No. 599,021

20 Claims. (Cl. 92—21)

This invention relates generally to the preparation of beater saturated papermaking fiber sheet materials. More particularly, the invention relates to a process of preparing beater saturated sheet materials in which the rubber content of a rubber latex is deposited upon the fibers while the fibers are in aqueous suspension. Still more particularly, the invention relates to a method of increasing the tensile strength of sheets formed by conventional papermaking beater saturated processes. The invention also relates to the product prepared by such processes.

The invention contemplates increasing the tensile strength of a beater saturated sheet by forming a slurry of papermaking fibers in water. A synthetic rubber binder is deposited on these fibers to form rubber-coated fibers. There is then added to the resulting slurry a water-soluble salt of polyacrylic acid, which polymer then precipitates on the rubber-coated fibers. The slurry of coated fibers is then formed into a sheet.

The fibers contemplated for treatment by the present invention are those fibers usually found in paper or felted products and include such fibers as kraft, sulfite, cotton, asbestos, and the like. The character of the fibers involved in the present invention is not critical save that where asbestos fibers are used a separate precipitation step for precipitating the polyacrylic acid is unnecessary. This situation will be described more fully below.

In accordance with the usual beater saturation technique the chosen fibers will be taken up in water to form a slurry having about 0.5%–3% consistency. Preferably the consistency will be about 1%. The slurried fibers may be refined by a Jordan engine or beater to produce the desired Canadian freeness. After the slurry has been formed and the desired freeness obtained, a synthetic rubber latex will be added to the slurry and the rubber content of the latex will be deposited on the fibers.

The rubberlike binder employed in the practice of this invention may be any of a number of synthetic rubbers used in the practice of conventional beater saturation methods. Typical of these synthetic rubbers are the products known as GR–S, which is a copolymer of butadiene and styrene containing about 50% to about 70% butadiene; Hycar, which is a copolymer of butadiene and acrylonitrile containing about 55% to about 80% butadiene; and neoprene, which is a polymer of 2-chloro-butadiene-1,3, generally referred to as polychloroprene. If desired, homopolymers of butadiene may be employed, as well as homopolymers and/or copolymers of butadiene homologues such as isoprene. These materials can be generally designated as synthetic rubbers and more specifically designated as rubberlike polymers of butadiene, isoprene, and chloroprene, and rubberlike polymers of butadiene or isoprene with copolymerizable vinyl compounds such as styrene and acrylonitrile. Mixtures of synthetic rubbers can be used. As is well-known in beater saturation methods, these synthetic rubbers are added to the slurry in the form of a latex. These latices normally contain about 25% to about 40% solids. Such latices contain additional compounding ingredients such as stabilizers and the like which are well-known in the art and which form no part of this invention.

The rubber content of the synthetic rubber latex may be deposited on the fibers by any convenient means. For example, the fibers may be pretreated so as to bring about deposition of the synthetic rubber binder once the binder has been dispersed in the water slurry. Alternatively, the slurry of fibers containing the dispersed synthetic rubber latex may be so treated as to bring about precipitation of the rubber binder on the fibers. An excellent method for depositing a synthetic rubber binder on papermaking fibers in an aqueous slurry is set forth in U. S. Patent No. 2,375,245—Pretzel. Other substances such as the clays, asphalts, or resins, or mixtures thereof, may be deposited on the fibers with the rubber.

Following the deposition of the synthetic binder on the papermaking fibers, there is added to the slurry of coated fibers a water-soluble salt of polyacrylic acid. The polyacrylic acid should have a molecular weight in the range of about 5,000–20,000, with 10,000 being preferred. It will be added in the form of a water-soluble alkali metal, ammonium, or other water-soluble salt of polyacrylic acid, the salt being used in order to render the polymer water-soluble. These polymers are prepared in known ways either by the polymerization of the sodium salt of acrylic acid or by the neutralization of polyacrylic acid. These polyacrylic acid salts are normally sold as latex stabilizers and film formers. However, it has been discovered that they do no serve any useful role in beater saturation processes if they are added after mechanical refining and before the addition of a binder system to the slurry. If the polyacrylic acid salts are present in the slurry when the rubber latex is introduced, the salts interfere with the deposition of the latex. The salts reduce the freeness of the precipitated slurry and actually decrease the tensile strength of the finished sheet. Accordingly, it is important and critical that the polyacrylic acids salts be added to the slurry subsequent to the deposition of the synthetic rubber binder on the fibers.

The amounts of the water-soluble polyacrylate salts to be added to the slurry will generally range from about 0.5% to about 2% by weight based on the weight of the furnish being used, that is, based on the total dry weight of the fibers. Amounts less than about 0.5% by weight do not yield useful results and amounts greater than about 2% by weight give little additional increase in tensile strength of the finished sheet.

Once the water-soluble salt of polyacrylic acid has been added to the slurry of rubber-coated fibers and well-dispersed therein, the polyacrylic acid should be precipitated out on the coated fibers. This may be accomplished by the use of polyvalent metal ions such as aluminum, magnesium, ferric, stannic, and similar ions. The polyvalent metal ion is preferably added in the form of a water solution and will, for example, be in the form of the inorganic salts such as the sulfate, chloride, nitrate, and the like.

Where asbestos fibers are used as the papermaking fibers, it will be unnecessary to add additional polyvalent metal ion in order to precipitate the polyacrylic acid onto the coated fibers. This is true because slurries containing asbestos fibers will already contain sufficient magnesium ion to accomplish the precipitation. Thus, where asbestos sheets are being prepared, the mere addition of the water-soluble salt of polyarcylic acid will suffice to bring about precipitation of the polyacrylic acid onto the rubber-coated fibers. Where the present specification and claims discuss the precipitating of polyarcylic acid, it is understood that both the use of a precipitating agent (polyvalent metal ions) as an additive and the use of the ions already present from asbestos fibers are contemplated.

After the precipitation of the polyacrylic acid on the rubber-coated fibers, the resulting slurry is then formed into a sheet on conventional papermaking equipment such as a Fourdrinier wire or a cylinder machine. Drying of the sheets will generally be accomplished in the drying section of the paper machine. It will be found that sheets formed in accordance with the present invention will show an increase in tensile strength of 10%–50% over sheets prepared under identical conditions save for the precipitation of polyacrylic acid on the rubber-coated fibers.

The following examples illustrate several embodiments of the present invention. All parts are by weight unless otherwise stated.

*Example I*

Two sheets were formed under identical conditions. The fibers were taken up in water and treated with agitation with the following ingredients in the order shown. One sheet was made with the sodium salt of polyacrylic acid and the other sheet was made without such salt. The following tabulation lists the ingredients and the results.

| Ingredients | Parts | Parts |
| --- | --- | --- |
| Water | 3,750 | 3,750 |
| Asbestos (5D) | 37.5 | 37.5 |
| Sodium citrate | 0.75 | 0.75 |
| sym. di-beta-naphthyl-p-phenylene diamine (48% dispersion) | 0.15 | 0.15 |
| Butadiene-styrene copolymer latex (50% butadiene), 40% | 18.8 | 18.8 |
| Alkyl aryl sulfonate, 10% aqueous solution dispersing agent (to rubber latex) | 0.5 | 0.5 |
| Sodium salt of polyacrylic acid, 5% aqueous solution, molecular weight, 10,000 | | 7.5 |
| Canadian freeness, cc | 650 | 520 |
| Tensile strength, lbs./sq. in | 1,615 | 2,165 |

*Example II*

Two sheets were made as in Example I save the following formulations were used.

| Ingredients | Parts | Parts |
| --- | --- | --- |
| Water | 4,500 | 4,500 |
| 50-50 mixture kraft and rag fibers (300 cc. C. F.) | 33.75 | 33.75 |
| Wood flour, 250 mesh | 11.25 | 11.25 |
| Alum | 5.4 | 5.4 |
| Aqua ammonia | 4.4 | 4.4 |
| sym. di-beta-naphthyl-p-phenylene diamine (48% dispersion) | 0.25 | 0.25 |
| Butadiene-acrylonitrile copolymer, 38.7% (Hycar 1561) | 5.2 | 5.2 |
| Butadiene-styrene copolymer latex, (50% butadiene), 41% | 28.0 | 28.0 |
| Sodium salt of polyacrylic acid (mol. wt. 10,000) 5% aqueous solution | | 9.0 |
| Alum, 10% aqueous solution | | 9.0 |
| Canadian freeness, cc | 400 | 380 |
| Tensile strength, lbs./sq. in | 3,490 | 4,137 |

*Example III*

Two sheets were prepared as in Example I, with the following formulations.

| Ingredients | Parts | Parts |
| --- | --- | --- |
| Water | 3,750 | 3,750 |
| Asbestos (5D) | 37.5 | 37.5 |
| Sodium citrate | 0.75 | 0.75 |
| sym. di-beta-naphthyl-p-phenylene diamine (48% dispersion) | 0.15 | 0.15 |
| Polychloroprene, 39% (Neoprene 735) | 19.3 | 19.3 |
| Sodium salt polyacrylic acid, 5% solution | | 7.5 |
| Canadian freeness, cc | 660 | 630 |
| Tensile strength, lbs./sq. in | 2,750 | 3,060 |

I claim:
1. The method of increasing the tensile strength of a beater saturated sheet, which method comprises forming a slurry of papermaking fibers in water, depositing a synthetic rubber binder on said fibers to form rubber-coated fibers, adding to the resulting slurry a water-soluble salt of polyacrylic acid, precipitating said polyacrylic acid on said coated fibers, and forming the resulting slurry of coated fibers into a sheet.

2. The method according to claim 1 wherein said synthetic rubber binder comprises a butadiene-styrene copolymer.

3. The method according to claim 1 wherein said synthetic rubber binder comprises a butadiene-acrylonitrile copolymer.

4. The method according to claim 1 wherein said salt comprises the sodium salt of polyacrylic acid having a molecular weight of about 10,000.

5. The method according to claim 1 wherein said salt is present in an amount of about 0.5%–2% by weight of said papermaking fibers.

6. The method according to claim 1 wherein said precipitating step is accomplished by the presence of polyvalent metal ions present in said water.

7. The method of increasing the tensile strength of a beater saturated sheet, which method comprises forming a slurry of papermaking fibers in water, adding to said slurry a synthetic rubber latex, precipitating said synthetic rubber onto said fibers, adding to the resulting slurry a water-soluble salt of polyacrylic acid, adding polyvalent metal ions to said slurry to precipitate said polyacrylic acid onto said rubber-coated fibers, and forming the resulting slurry of coated fibers into a sheet.

8. The method according to claim 7 wherein said salt is added in an amount of about 0.5%–2% by weight of said fibers.

9. The method according to claim 7 wherein said synthetic rubber binder comprises a butadiene-styrene copolymer.

10. The method according to claim 7 wherein said synthetic rubber binder comprises a butadiene-acrylonitrile copolymer.

11. The method of increasing the tensile strength of a beater saturated asbestos sheet, which method comprises forming a slurry of asbestos fibers in water, depositing a synthetic rubber binder on said fibers to form rubber-coated fibers, adding to the resulting slurry a water-soluble salt of polyacrylic acid, whereby said polyacrylic acid deposits on said rubber-coated fibers, and forming the resulting slurry of coated fibers into a sheet.

12. The method according to claim 11 wherein said salt is added in an amount of about 0.5%–2% by weight of said asbestos fibers.

13. The method according to claim 11 wherein said synthetic rubber binder comprises a butadiene-styrene copolymer.

14. The method according to claim 11 wherein said synthetic rubber binder comprises a butadiene-acrylonitrile copolymer.

15. A felted water-laid sheet product comprising papermaking fibers having a synthetic rubber binder deposited thereon and polyacrylic acid deposited on said rubber-coated fibers.

16. A product according to claim 15 wherein said papermaking fibers comprise cellulosic fibers.

17. A product according to claim 15 wherein said papermaking fibers comprise asbestos fibers.

18. A product according to claim 17 wherein the rubber binder comprises a butadiene-styrene copolymer.

19. A product according to claim 15 where said synthetic rubber binder comprises a butadiene-styrene copolymer.

20. A product according to claim 15 wherein said synthetic rubber binder comprises a butadiene-acrylonitrile copolymer.

References Cited in the file of this patent

UNITED STATES PATENTS

| | | |
|---|---|---|
| 2,613,190 | Feigley | Oct. 7, 1952 |
| 2,676,099 | Kao | Apr. 20, 1954 |
| 2,694,633 | Pattilloch | Nov. 16, 1954 |
| 2,715,066 | Feigley | Aug. 9, 1955 |

FOREIGN PATENTS

| | | |
|---|---|---|
| 154,799 | Australia | Jan. 19, 1954 |

UNITED STATES PATENT OFFICE
Certificate of Correction

Patent No. 2,868,641 January 13, 1959

David A. Feigley, Jr.

It is hereby certified that error appears in the printed specification of the above numbered patent requiring correction and that the said Letters Patent should read as corrected below.

Column 1, lines 60 and 61, for "butadiene-1,3," read —butadiene-1-3,—; line 69, for "acryonitrile" read —acrylonitrile—; column 2, line 18, after "synthetic" insert —rubber—; line 31, for "no" read —not—; line 40, for "acids" read —acid—; lines 68 and 71, for "polyarcylic" read —polyacrylic—; column 4, line 72, for "where" read —wherein—.

Signed and sealed this 28th day of April 1959.

[SEAL]

Attest:
T. B. MORROW,
Attesting Officer.

ROBERT C. WATSON,
Commissioner of Patents.